UNITED STATES PATENT OFFICE.

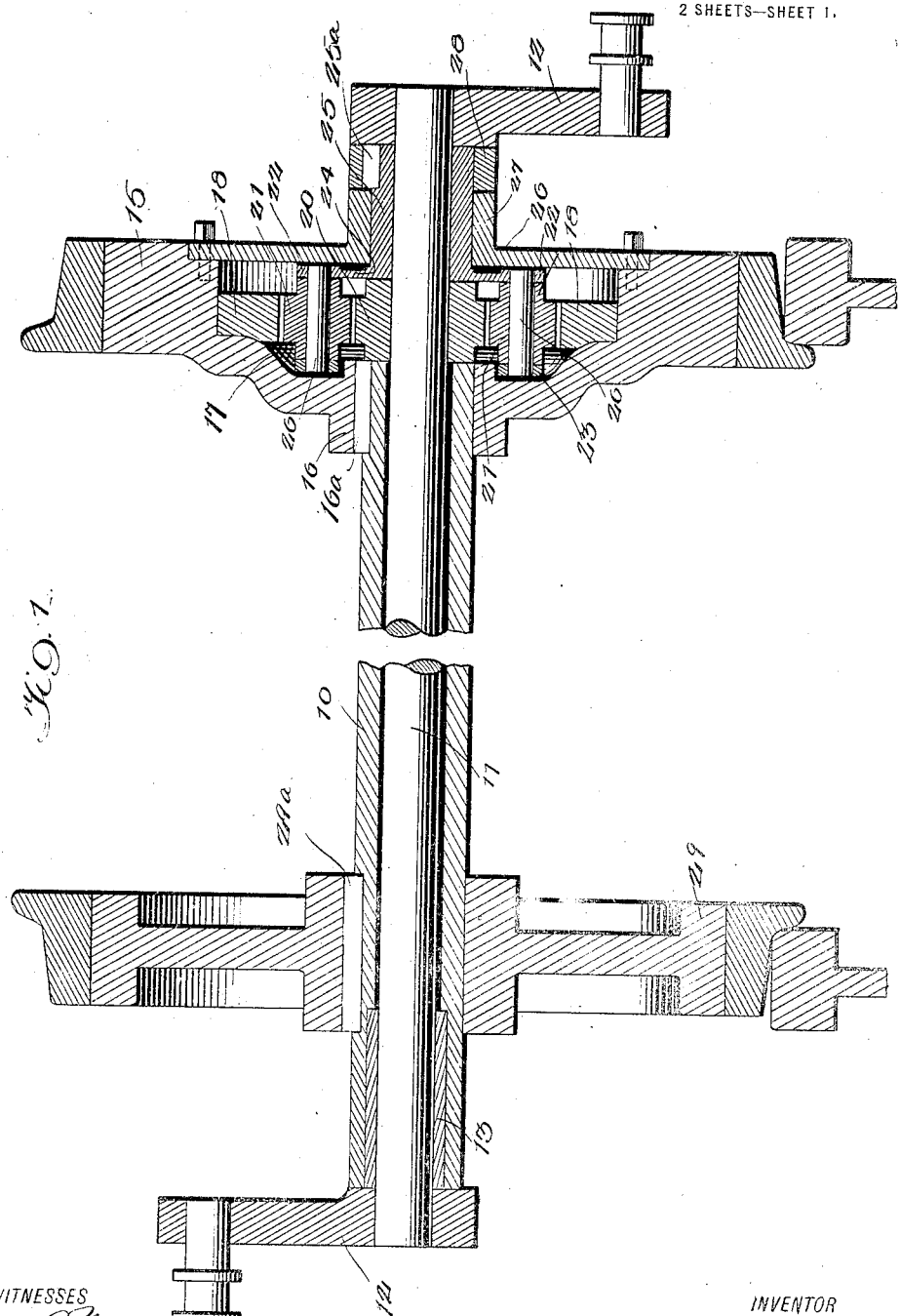

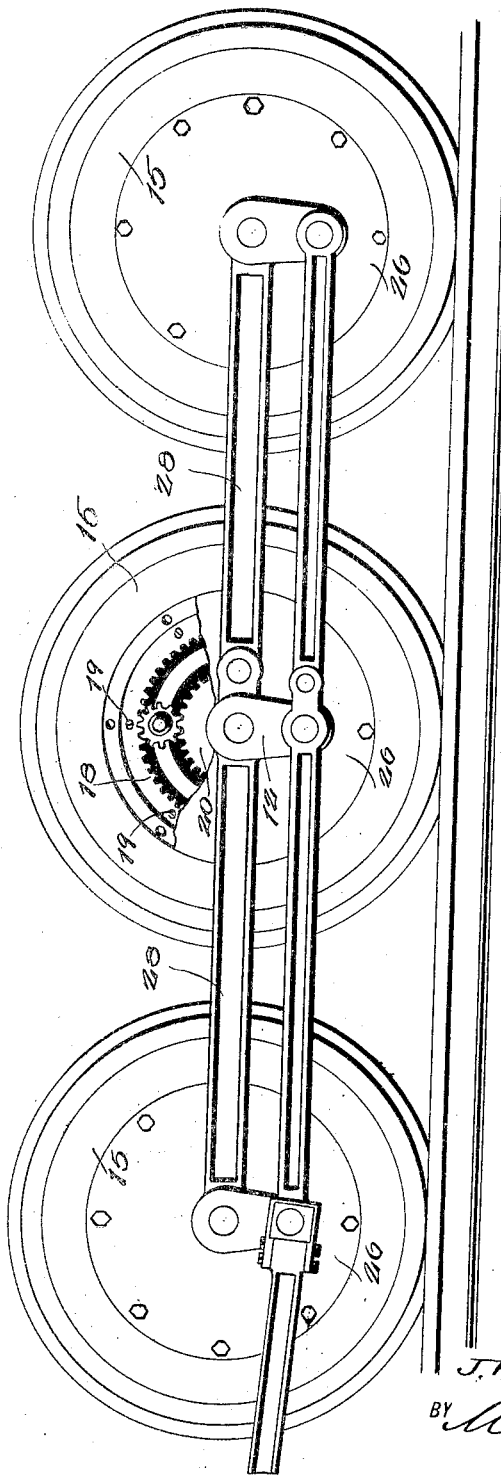

JAMES FRANCIS McCARROLL, OF HOLDEN, LOUISIANA.

LOCOMOTIVE-DRIVER.

1,382,303.  Specification of Letters Patent.  Patented June 21, 1921.

Application filed February 9, 1921. Serial No. 443,624.

*To all whom it may concern:*

Be it known that I, JAMES FRANCIS Mc-CARROLL, a citizen of the United States, and a resident of Holden, in the parish of Livingston and State of Louisiana, have invented certain new and useful Improvements in Locomotive-Drivers, of which the following is a specification.

The present invention relates in general to locomotives, and more particularly to locomotive drivers of the gear type.

The object of the invention is to provide a locomotive driver of this character which provides for any gear ratio, which is of such simple and compact construction that it resembles and partakes of all the advantages of the directly connected driver whereby the number of gear drivers are limited only by the same requirements that operate with respect to direct drivers, and which is possessed of a high degree of durability, is reliable in operation and easy and inexpensive to manufacture and apply.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a transverse vertical sectional view of the invention; and

Fig. 2 is a side elevation of the geared drivers, the cover plate of one of said drivers being removed for the sake of illustration.

Referring to the drawings wherein for the sake of illustration is shown the preferred embodiment of the invention, it will be seen that the invention contemplates a hollow axle, designated at 10. A crank shaft designated at 11 is arranged within the hollow axle and carries cranks 12 at each end thereof. Bearing bushings such as at 13 are associated with the hollow axle and adjacent parts to take up wear and the like.

A geared driver designated generally at 15, is provided, and has a hub 16 keyed or otherwise secured to the hollow axle, as indicated at 16$^a$. The body of the driver is recessed, as at 17, and an internal ring gear 18 is arranged in the recess and secured to the body of the wheel by means of short lag screws 19 or the like. A driving gear or pinion 20 is fixed to the crank shaft within the recess formed in the body of the wheel and in vertical alinement with the internal ring gear 18. Planetary pinions 21 are arranged between the driving pinion and the internal ring gear pinion and mesh with both of these elements. These planetary pinions are shown in this embodiment as two in number but any desired number may be employed. The planetary pinions are carried upon a frame, designated generally at 22, and including an inner section comprising a ring 23 and an outer section comprising a ring 24 having an annular hub 25 integral therewith and loosely journaled on the crank shaft 11. Short shafts 26 extend between the rings 23 and 24 and rotatably carry the planetary pinions.

A cover plate 26 is provided and is arranged in a suitable countersink provided therefor to completely inclose the gearing and the operating parts thereof. The cover plate 26 is provided at its inner end with an annular flange 27 arranged upon the annular hub 25 so as to be adapted to permit relative rotation of the hub with respect thereto. The outer end of the annular flange 27 terminates short of the crank 12 and in the space between this crank and the flange a tie rod or torque rod 28 is arranged. The tie rod 28 embraces the annular hub 25 and is keyed thereto, as at 25$^a$.

A driving wheel 29 is mounted on the hollow axle 10 at the end opposite the gear driver 15, and is keyed or otherwise secured thereto, as shown at 29$^a$.

In practice, it will be seen that with the assembly described any number of gear drivers may be embodied in the assembly and they may be organized with drivers of the direct type. In the action of the gear driver the motion is taken from the crank shaft by the driving pinion 20 which is keyed or otherwise fixed thereto and transmitted to the planetary gears 21 loosely carried upon the frame 22. The planetaries rotate about the short shafts 26 by which they are carried and also roll upon the internal ring gear 18 transmitting their motion to the ring gear and thereby transmitting to the driver the motion of the crank shaft and of the cranks 12 carried thereby. The driver 15 being keyed to the hollow axle 10, the axle rotates with this driver 15 and transmits similar rotative movement to the driver 29.

I claim:

1. In a locomotive of the character described, a hollow axle, a crank shaft arranged in said hollow axle, cranks at the ends of said crank shaft, a gear driver having a hub fixed to said hollow axle at one end thereof and having a recess in its body portion, an internal ring gear fixed to the body portion of said driver within said recess, a driving gear fixed to the crank shaft within said recess, planetary gears meshing with said driving gear and with said internal ring gear, a frame carrying said planetary gears and consisting of an inner section comprising a ring, an outer section comprising a ring having an annular hub journaled on the crank shaft and short shafts extending between said rings and carrying said planetary pinions, a cover plate for said recess secured thereto and having an annular flange journaled on the hub of said outer section and terminating short of the crank, a tie or torque rod arranged on the hub of said outer section intermediate said annular flange and keyed to said annular hub, and a driver fixed to said hollow axle at the opposite end thereof.

2. In a locomotive of the character described, a hollow axle, a crank shaft arranged in said hollow axle, cranks at the ends of said crank shaft, a gear driver having a hub fixed to said hollow shaft at one end thereof and having a recess in its body portion, an internal ring gear fixed to the body portion of said driver within said recess, a driving gear fixed to the crank shaft within said recess, planetary gears meshing with said driving gear and with said internal ring gear, and a frame carrying said planetary gears and consisting of an inner section comprising a ring, an outer section comprising a ring having an annular hub journaled on the crank shafts and short shafts extending between said rings and carrying said planetary pinions.

3. In a locomotive of the character described, a hollow axle, a crank shaft arranged in said hollow axle, cranks at the ends of said crank shaft, a gear driver having a hub fixed to said hollow shaft at one end thereof and having a recess in its body portion, an internal ring gear fixed to the body portion of said driver within said recess, a driving gear fixed to the crank shaft within said recess, planetary gears meshing with said driving gear and with said internal ring gear, a frame carrying said planetary gears, and a cover plate for said recess secured thereto.

4. In a locomotive of the character described, a hollow axle, a crank shaft journaled in said axle, cranks at each end of said crank shaft, a gear driver fixed to one end of said crank shaft and having a recess, planetary gearing arranged in said recess for transmitting the motion of said crank shaft to said gear driver, a tie or torque rod intermediate said gear driver and the adjacent crank and a driver fixed to said hollow axle at the end opposite from said gear driver.

5. A locomotive of the character described, comprising a hollow axle, a crank shaft journaled in said hollow axle, a gear driver having a hub fixed to said hollow axle and having its body portion provided with a recess, an internal ring gear arranged in said recess and secured to said driver, a driving pinion fixed to the crank shaft, and planetary pinions meshed with said internal ring gear and said driving gear.

6. In a locomotive of the character described, a hollow axle, a crank shaft arranged in said hollow axle, a gear driver fixed to said axle, and planetary gearing for transmitting the motion of said crank shaft to said driver.

7. In a locomotive of the character described, a hollow axle, a crank shaft arranged in the hollow axle, cranks at the ends of said crank shaft, a gear driver having a hub fixed to said hollow axle at one end thereof and having a recess in its body portion, an internal ring gear fixed to the body portion of said driver within said recess, a driving gear fixed to the crank shaft within said recess, planetary gears meshing with said driving gear and with said internal ring gear, a frame carrying said planetary gears and consisting of an inner section comprising a ring, an outer section comprising a ring having an annular hub journaled on the crank shaft, and short shafts extending between said rings and carrying said planetary pinions, and a tie or torque rod arranged on said annular hub and keyed thereto.

8. In a locomotive of the character described, a hollow axle, a crank shaft arranged in the hollow axle, cranks at the ends of said crank shaft, a gear driver having a hub fixed to said hollow axle at one end thereof and having a recess in its body portion, an internal ring gear fixed to the body portion of said driver within said recess, a driving gear fixed to the crank shaft within said recess, planetary gears meshing with said driving gear and with said internal ring gear, a frame carrying said planetary gears and consisting of an inner section comprising a ring, an outer section comprising a ring having an annular hub journaled on the crank shaft, short shafts extending between said rings and carrying said planetary pinions, a tie or torque rod arranged on said annular hub and keyed thereto, and a driver fixed to said hollow axle at the opposite end thereof.

JAMES FRANCIS McCARROLL.